United States Patent [19]
Johnson

[11] Patent Number: 4,956,189
[45] Date of Patent: Sep. 11, 1990

[54] POTATO CHIP PRECOOKING METHOD

[75] Inventor: Norman B. Johnson, Dayton, Ohio

[73] Assignee: Mike-Sell's Potato Chip Co., Dayton, Ohio

[21] Appl. No.: 366,563

[22] Filed: Jun. 14, 1989

Related U.S. Application Data

[62] Division of Ser. No. 164,934, Mar. 7, 1988, Pat. No. 4,867,049.

[51] Int. Cl.$^5$ .............................................. A23L 1/217
[52] U.S. Cl. ...................................... 426/233; 426/438
[58] Field of Search ................. 99/330, 339, 353, 357, 99/406, 407; 426/438, 519, 233, 509

[56] References Cited

U.S. PATENT DOCUMENTS

| | | | |
|---|---|---|---|
| 1,086,248 | 2/1914 | Varian . | |
| 1,808,215 | 6/1931 | Friedel . | |
| 2,599,894 | 6/1952 | Campbell . | |
| 2,685,249 | 8/1954 | Badger | 99/403 |
| 2,836,496 | 5/1958 | Salvo . | |
| 2,934,001 | 4/1960 | Cunmnmingham et al. | 99/406 |
| 3,223,024 | 12/1965 | Benson et al. | 99/352 |
| 4,020,189 | 4/1977 | Wright et al. | 426/438 |
| 4,366,749 | 1/1983 | Caridis et al. | 426/438 X |
| 4,392,420 | 7/1983 | Caridis et al. | 99/406 |
| 4,439,459 | 3/1984 | Swartley | 426/438 |
| 4,491,602 | 1/1985 | Miller | 426/438 |
| 4,694,743 | 9/1987 | Groff | 99/405 |
| 4,706,556 | 11/1987 | Wallace et al. | 99/330 |
| 4,741,912 | 5/1988 | Katz et al. | 426/438 |

*Primary Examiner*—Arthur L. Corbin
*Attorney, Agent, or Firm*—Biebel, French & Nauman

[57] ABSTRACT

A potato chip production line has an improved precooking process and apparatus which includes an elongated sluice having a moving stream of heated precooking liquid of a temperature within a desired range of 200 to 300 degrees F. at an upstream end of the sluice, a conveyor for introducing thin starch-coated potato slices into the stream at the sluice upstream end, paddle wheels rotatably mounted in the sluice at sites spaced along and within the stream for partially damming the stream and the potato slices carried therein at the sites in order to control the stream level and the degree of precooking of the slices, and nozzles connected to the sluice in communication with the stream and disposed adjacent to the respective sites and generally below the paddle wheels. The nozzles inject jets of heated precooking liquid into the stream along paths directed generally downstream of and tangential to the rotational path of the paddle wheels in order to maintain the temperature of the liquid within the desired range and concurrently to disperse and thereby prevent accumulation of the starch-coated potato slices at the sites as a result of the partial damming of the stream at the sites by the paddle wheels.

9 Claims, 5 Drawing Sheets

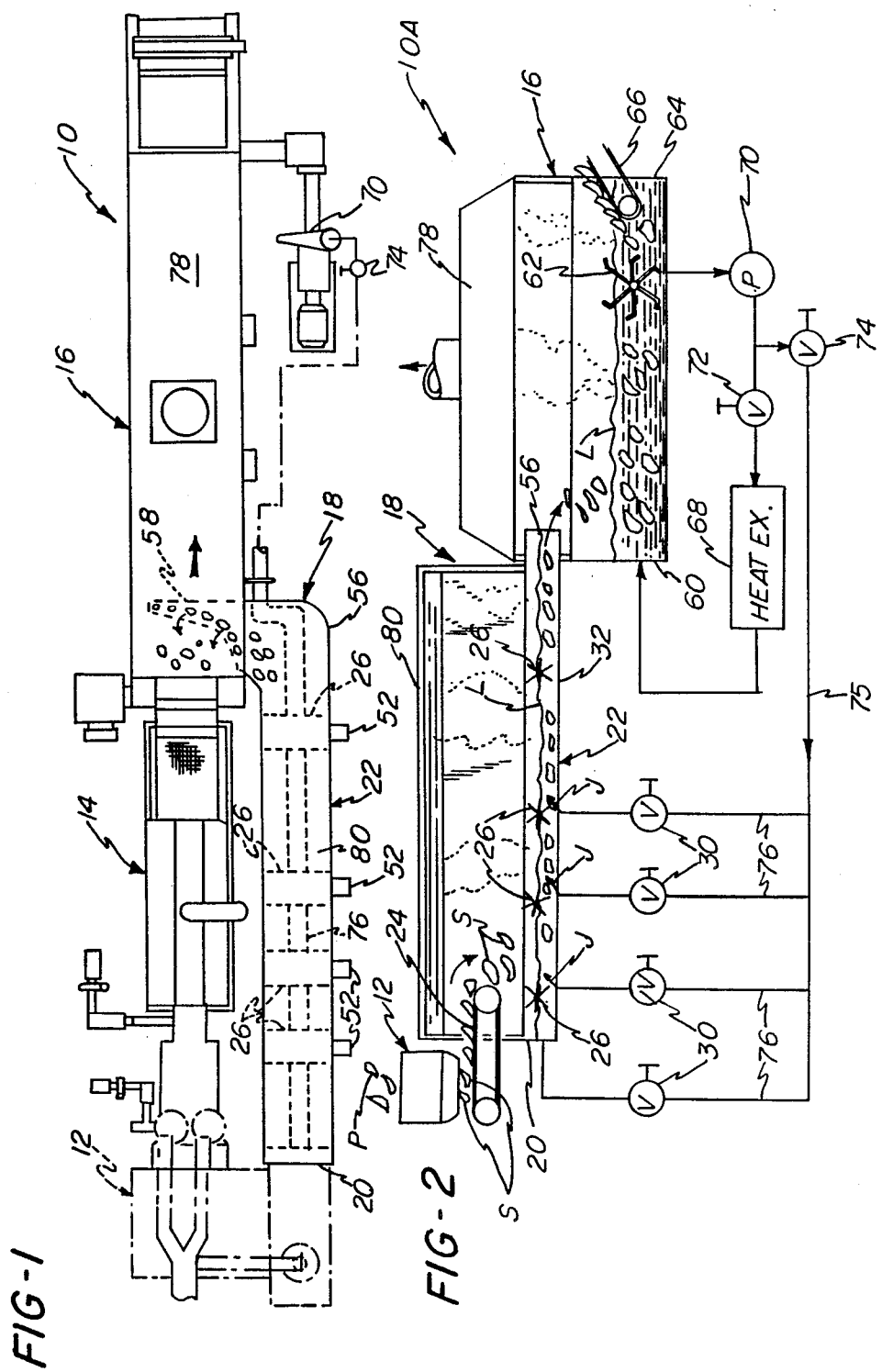

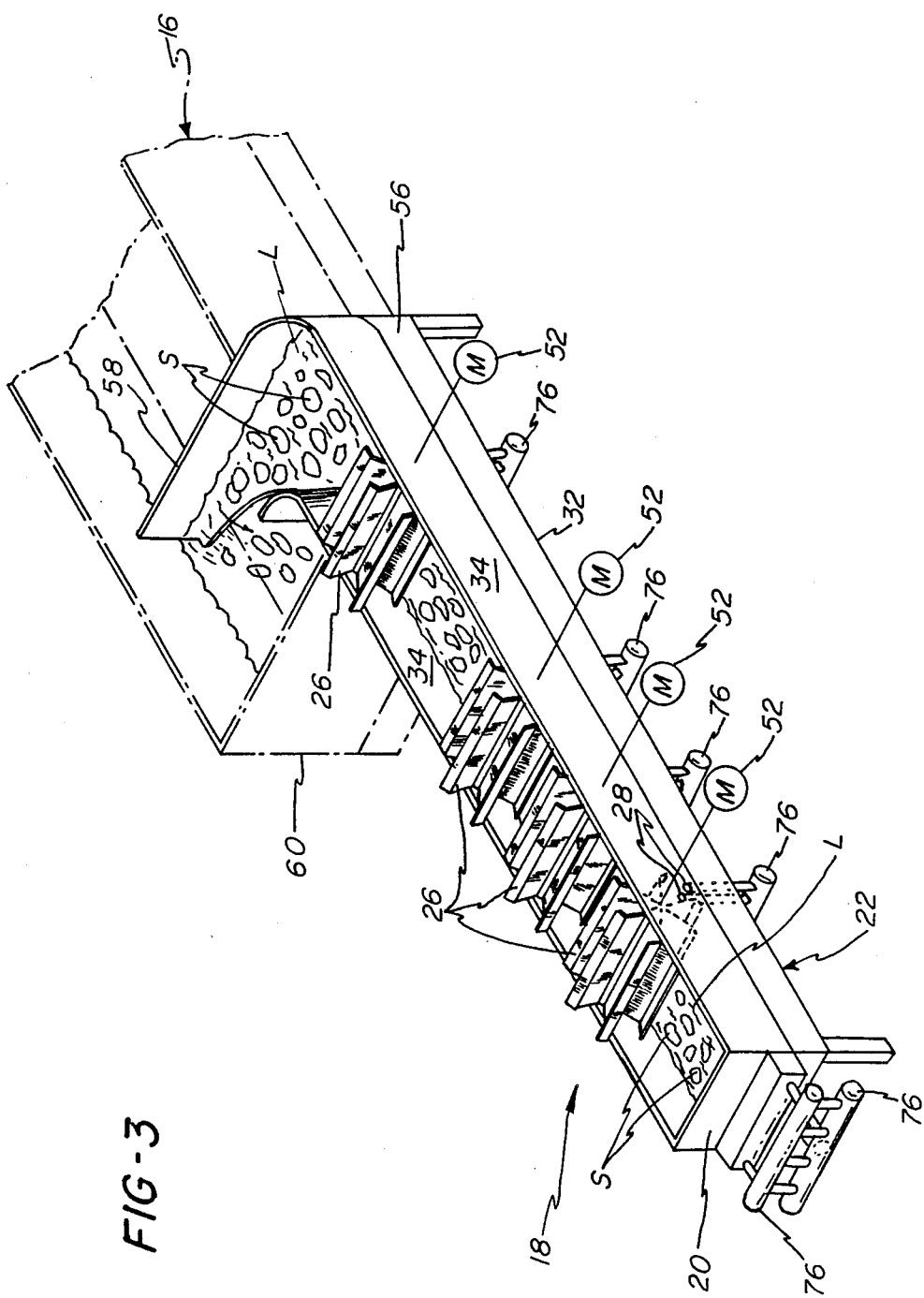

POTATO CHIP PRECOOKING METHOD

This is a divisional application of application Ser. No. 164,934, filed Mar. 7, 1988, now U.S. Pat. No. 4,867,049.

CROSS-REFERENCE TO RELATED APPLICATION

Reference is made to copending U.S. patent application Ser. No. 900,933, filed Aug. 27, 1986, assigned to the assignee of the present invention and entitled: "Method of and Apparatus for Preparing a Food Product", the disclosure of which is incorporated herein by reference.

BACKGROUND OF THE INVENTION

The present invention generally relates to cooking of food products and, more particularly, to an improved method and apparatus for precooking of food product slices in a continuous stream of cooking oil upstream of a conventional fryer.

Potato chips were originally prepared on a batch basis. Hand cut potato slices were immersed in a kettle of hot cooking oil and cooked until they achieved a desired appearance. The chips were then removed from the cooking oil and allowed to drain.

With the increased popularity of potato chips and the commensurate increase in demand for this product, processes and equipment were developed to prepare potato chips on a continuous basis and thereby increase production volumes. Typically, in the continuous production of potato chips, raw potatoes are first peeled and sliced. Next, the resulting slices are washed, usually with water, to remove the starch which is released during the slicing process and coats the potato slices. The washed slices are then dropped into a fryer containing a continuous stream of heated cooking oil at a temperature of approximately 325 to 375 degrees F. In the ensuing cooking process moisture is released from the slices and replaced to some extent by the cooking oil. The final product will have an oil content of approximately 35% to 5% by weight and a moisture content of approximately 1.5% to 2.2% by weight.

Demand for potato chips continues to increase and is met for the most part by chips prepared on a continuous basis. However, more recently there has also been an increased demand for so-called "kettle cooked" chips which have the appearance and flavor of chips cooked by the old-fashioned batch process. However, the same problem exists today with respect to batch-prepared potato chips that existed at the original introduction of potato chips. That is, batch production is slow, which results in both an increased price for the batch-prepared product and insufficient volume to meet demand.

Recently a method and apparatus for carrying out the method have been developed for addressing the demand for "kettle cooked" chips. The method and apparatus, as disclosed in the patent application cross-referenced above, produce on a continuous, high volume basis potato chips having an appearance, texture and flavor heretofore found in chips prepared on a batch basis. This is achieved by introducing and precooking unwashed potato slices for about several seconds in a sluice containing a continuous stream of cooking oil heated to a temperature of approximately 200 to 300 degrees F. Thereafter, the precooked slices are cooked or fried for about 5 to 10 minutes in a conventional fryer containing a continuous stream of cooking oil maintained at a temperature of approximately 300 to 400 degrees.

In this method, the layer of natural starch coating or enveloping the freshly sliced potatoes is caramelized in the precooking step to form a barrier which resists the penetration of cooking oil in the subsequent cooking or frying step. The resulting potato chip has a lower oil content, approximately 28% to 35% by weight, than chips cooked in a conventional manner e.g 35% to 45% by weight. Additionally, the caramelized starch coating on the slices tends to retard the rate at which moisture leaves the slice As the moisture escapes it tends to puff the potato slices, resulting in an uneven, more textured appearance with small air pockets under the surface of the chip This imparts a lightness and crisper, crunchier quality to the chip.

In the apparatus, the sluice is provided upstream of the conventional fryer and downstream from a conventional potato slicer. The conventional fryer is typically associated with a heat exchanger which receives oil from the downstream end of the fryer, reheats it to a desired temperature and recirculates the heated oil back to the fryer. With provision of the sluice, only a portion of the oil from the downstream end of the fryer is routed to the heat exchanger.

The remaining portion is diverted to the sluice, with appropriate control to ensure that the oil introduced into the sluice is in the desired range of temperatures for caramelizing the starch envelope on the raw potato slices. Oil level in the sluice and the degree of precooking in the sluice are controlled through the use of variable speed paddle wheels located within the sluice.

The precooking method and apparatus of the above cross-referenced application has performed satisfactorily in producing on a continuous, high volume basis potato chips having an appearance, texture and flavor found heretofore in chips prepared on a batch basis. However, after an initial period of experience with the above-described precooking method and apparatus it has been realized that further improvements are needed to enhance the overall performance thereof and quality of the food product.

SUMMARY OF THE INVENTION

The present invention provides an improved precooking method and apparatus designed to satisfy the aforementioned needs. Improvement of the precooking method and apparatus of the above cross-referenced application is brought about by features that provide more refined control of the depth or level of the precooking liquid stream and of the temperature of the precooking liquid and that prevent clogging of the stream by the starch-coated potato slices being carried by the stream.

The features which provide more refined control of liquid stream level relate to means for partially damming the stream in the form of rotating paddle wheels disposed within a sluice at multiple, spaced apart sites along the stream flowing in the sluice. The features which provide more refined temperature control and prevent the slices from clogging the stream at the spaced apart sites relate to means for injecting precooking liquid in the form of a series of nozzles located at each of the spaced apart sites adjacent to and below the rotating paddle wheels.

Therefore, in accordance with the present invention, a food product precooking method is provided which comprises the steps of: producing a moving stream of heated precooking liquid having a temperature within a desired range of 200 to 300 degrees F. at an upstream end of the stream; introducing thin slices of raw potatoes enveloped in a natural starch coating into the upstream end of the precooking liquid stream; partially damming the precooking liquid stream and the potato slices carried therein at multiple, spaced apart sites along the stream in order to control the level of liquid therein and the degree of precooking of the slices therein; and injecting heated precooking liquid into the stream adjacent to the spaced apart sites in order to maintain the temperature of the liquid within the desired range along the stream and concurrently to disperse and thereby prevent accumulation of the starch-coated potato slices at the sites as a result of the partial damming of the stream at the sites.

Also, in accordance with the present invention a food product precooking apparatus is provided which comprises: an elongated sluice provided with a moving stream of heated precooking liquid having a temperature within a desired range of 200 to 300 degrees F. at an upstream end of the sluice; means for introducing thin slices of raw potatoes enveloped in a natural starch coating into the stream of liquid at the upstream end of the sluice; means for partially damming the liquid stream and the potato slices carried therein at multiple spaced apart sites along the stream in order to control the level of liquid in the stream and the degree of precooking of the slices therein; and means for injecting heated precooking liquid into the stream adjacent to the spaced apart sites in order to maintain the temperature of the liquid within the desired range and concurrently to disperse and thereby prevent accumulation of the starch-coated potato slices at the sites as a result of the partial damming of the stream at the locations.

These and other features and advantages of the present invention will become more readily apparent from the following detailed description thereof.

BRIEF DESCRIPTION OF THE DRAWINGS

FIG. 1 is a top plan view of a conventional potato chip continuous production line, with the improved potato slice precooking apparatus of the present invention disposed in parallel, by-pass relationship to the potato slice washing apparatus of the conventional line and between the potato slicing and slice frying apparatuses thereof.

FIG. 2 is side elevational view, in somewhat schematic form, of the potato slicing and slice frying apparatuses of the conventional continuous production line and the improved precooking apparatus disposed therebetween.

FIG. 3 is a perspective view of the improved precooking apparatus illustrating its continuous stream of cooking oil and precooked slices emptying into an upstream portion of the slice frying apparatus of the conventional continuous production line, with the latter being shown in phantom.

DETAILED DESCRIPTION OF THE PREFERRED EMBODIMENT

Figure 4:
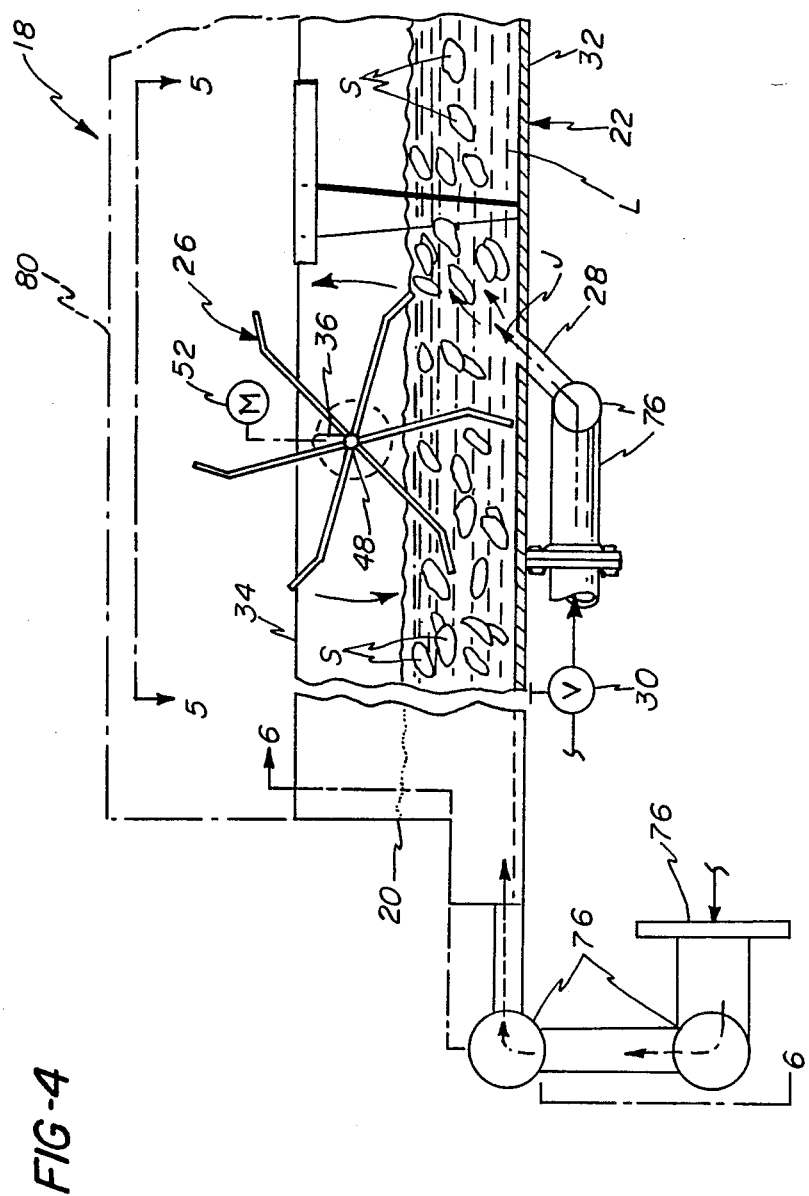
FIG. 4 is an enlarged fragmentary, foreshortened view of the improved precooking apparatus with a hood covering the sluice of the improved apparatus being shown in phantom.

Reference is made to FIG. 1 of the drawings which illustrates a conventional potato chip continuous production line, generally designated by the numeral 10. The conventional production line 10 employs, in a serial arrangement, potato peeling and slicing apparatus 12, potato slice washing apparatus 14, and potato slice frying or cooking apparatus 16. A preferred embodiment of the improved potato slice precooking apparatus of the present invention, generally designated 18, is disposed in parallel, by-pass relationship to the potato slice washing apparatus 14 of the production line 10 and between the upstream potato slicing apparatus 12 and downstream slice cooking apparatus 16 thereof. Given such an arrangement, whenever so desired it is possible to switch production from a conventional type of potato chip, wherein the entire conventional production line 10, is utilized to a potato chip produced by employment of the improved precooking apparatus 18 in conjunction with all components of the conventional production line except for the potato slice washing apparatus 14.

Referring now to FIG. 2, a modified production line, designated 10A, is somewhat schematically illustrated, employing the improved precooking apparatus 18. More particularly, raw, peeled potatoes P are shown being fed into the slicing apparatus 12 where they are cut into thin slices S. Slice thickness can be varied somewhat depending upon the characteristics of the final chip desired. For example, conventional potato chips will usually have a thickness of approximately 0.058 inch to 0.062 inch, while thicker chips may range up to 0.012 inch in thickness. For present purposes a "thin" slice can be defined as a slice having a thickness of 0.040–0.120 inch.

The thin potato slices S are then introduced either directly (such as by being dropped) into an upstream end 20 of an elongated sluice 22 of the improved precooking apparatus 18 or indirectly thereto by being fed from a conveyor 24. The thin potato slices S are enveloped in a natural starch coating released from crushed potato cells during the slicing of the potatoes P. The elongated sluice 22 is provided with a moving stream of heated precooking liquid L (such as cooking oil) having a temperature within the desired precooking range of 200 to 300 degrees F., at least at the upstream end 20 of the sluice 22.

The improved precooking apparatus 18 also includes means in the form of a plurality of paddle wheels 26 disposed in the sluice 22. The paddle wheels 26 are positively rotated to allow passage of the liquid stream and entrained slices S. At the same time, the paddle wheels 26 act to dam partially the liquid stream and the potato slices carried therein in order to control the level of the liquid L in the stream moving through the sluice 22 as well as the degree of precooking of the slices S therein.

Further, the precooking apparatus 18 includes means in the form of a plurality of nozzles 28 (FIG. 4) connected in communication with the stream in the sluice 22 for injecting heated precooking liquid L in the form of jets J (see arrows in FIG. 2, 4 and 5) into the stream adjacent to the sites spaced along the stream at which the paddle wheels 26 are located. A plurality of flow control valves 30 are provided in communication between the nozzles 28 and a source of heated precooking liquid to be described later in order to control the flow rate of liquid to the nozzles 28 and into the sluice stream and thereby maintain the temperature of the liquid L within the desired range along the length of the sluice 22.

Figure 5:
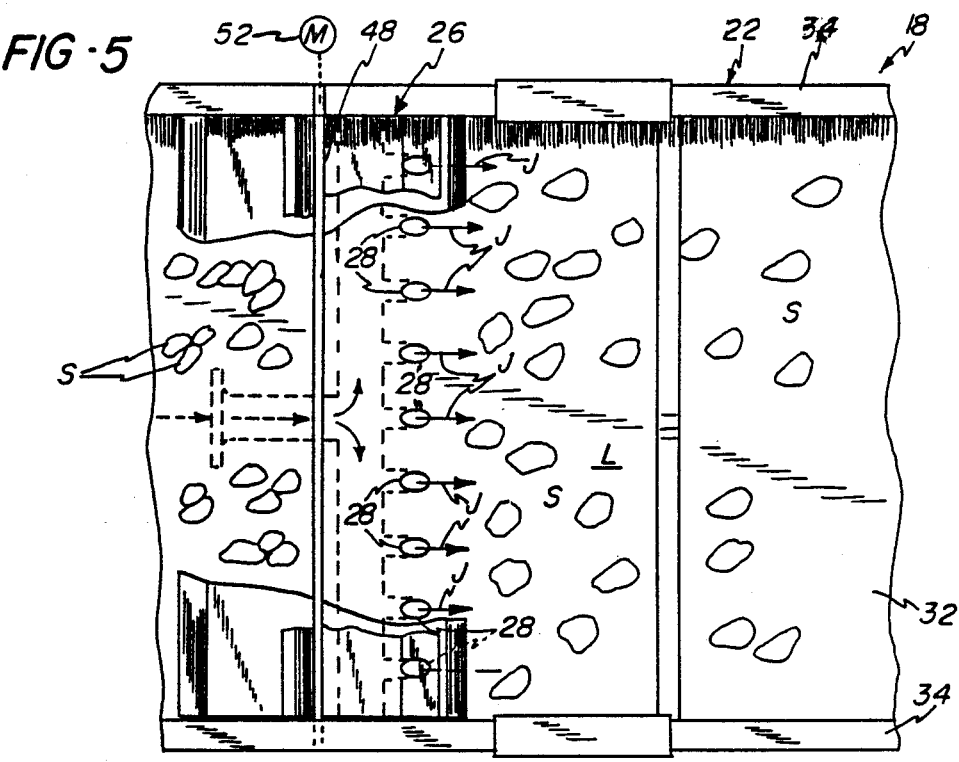
FIG. 5 is a top plan view of the improved precooking apparatus as seen along line 5—5 of FIG. 4 with the central portion of one of the flow control paddle wheels of the improved apparatus being broken away.

One problem encountered during the precooking of the slices S to cause caramelization of their natural starch is that the starch is sticky and thus tends to cause the slices to stick together and to the paddle wheels 26. To prevent sticking of the slices to the paddle wheels 26 and clogging of the stream at the locations of the sites, the nozzles 28 in the respective series thereof are arranged in a definite relationship with respect to the paddle wheels 26. Specifically, and as seen in FIG. 4, the nozzles 28 are disposed below the paddle wheels 26 and offset downstream of the rotational axes thereof. Each of the series of jets J of precooking liquid is injected by one of the series of nozzles 28 into the stream along paths extending in inclined fashion downstream of and generally tangential to the downstream side of the rotational path of the respective one of the paddle wheels.

The jets of liquid interact with the motion of the paddle wheels 26 to cause dispersal of the starch-coated potato slices S in the stream and thereby prevent accumulation of the slices at the paddle wheel sites as a result of the partial damming of the stream by the paddle wheels at those sites. As viewed in FIGS. 2 and 3, the longitudinally spaced apart sites of the paddle wheels 26 and nozzles 28 are generally in an upstream half of the elongated sluice 22. A final paddle wheel 26, without any nozzles being associated therewith, is located in the sluice 22 within a downstream half thereof.

Referring now to FIGS. 2-6, it can be seen that the sluice 22 has a longitudinally-extending bottom wall 32 and a pair of side walls 34 connected to opposite longitudinal side edges of the bottom wall 32 and extending in parallel relation upwardly therefrom. Each of the paddle wheels 26 extends transversely across and above the sluice bottom wall 32 and between said side walls 34 thereof.

Figure 7:
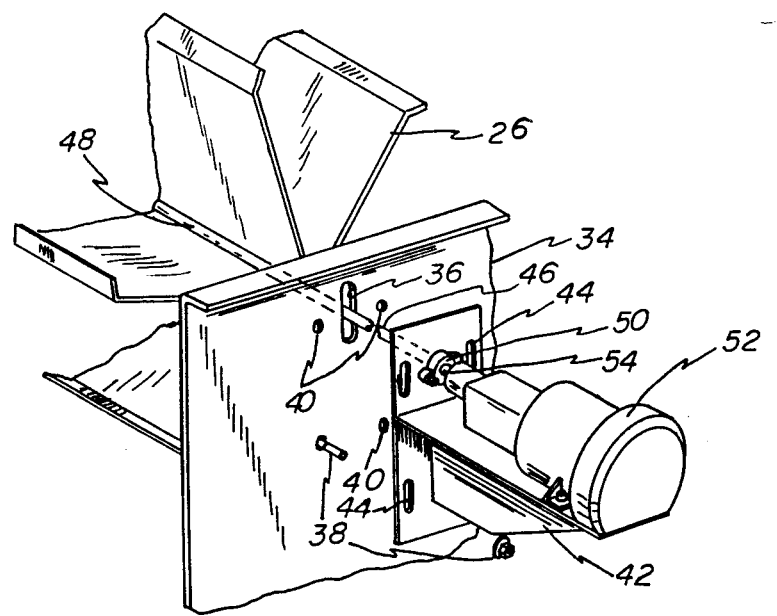
FIG. 7 is an enlarged exploded fragmentary perspective view of one of the flow control paddle wheels, a paddle wheel drive motor and an adjustable mounting bracket of the improved apparatus.

More particularly, as best seen in FIG. 7, means are provided for mounting opposite ends of each of the paddle wheels 26 to the sluice side walls 34 and for generally vertical adjustment along the side walls 34 toward and away from the bottom wall 32 thereof. Such mounting means encompasses oppositely aligned vertical slots 36 defined in the side walls 34 at the sites of the paddle wheels 26 along the sluice 22, fasteners 38 which fit through holes 40 defined in the side walls 34 about the vertical slots 36, and mounting brackets 42 having shorter vertical slots 44 adapted to receive the fasteners 38. Opposite ends 46 of a central shaft 48 of the respective paddle wheel 26 extend through the oppositely aligned side wall slots 36 and central openings 50 in the respective brackets 42. After the brackets 42 have been adjusted vertically to position the respective paddle wheel 26 in the desired relationship to the bottom wall 32 of the sluice 22, the fasteners 38 are tightened to clamp the mounting brackets 42 against the side walls 34 and maintain the paddle wheel 26 at such position.

As further shown in FIG. 7, each paddle wheel 26 has associated therewith power drive means for rotating the wheel 26 at the desired speed. More specifically, each power drive means preferably takes the form of an electric motor 52 disposed at one end of the respective paddle wheel 26 and supported on the one mounting bracket 42 associated with that end of the paddle wheel 26. The motor 52 has a rotary output shaft 54 drivingly coupled to one end 46 of the paddle wheel central shaft 48. It will be seen that adjustment of the vertical position of a paddle wheel 26 also causes a corresponding adjustment of the vertical position of the motor 52 with the respective mounting bracket 42.

As seen in FIGS. 1 and 3, at a downstream end 56 the sluice 22 is provided with a discharge chute 58 which causes the liquid stream flowing in the sluice 22 to turn a 90-degree corner and empty into an upstream end 60 of the cooking apparatus 16. In FIG. 2, one sees that the cooking apparatus 16 contains a continuous stream of cooking oil or liquid L and at least one flow control paddle wheel 62. At its downstream end 64 the cooking apparatus 16 has a conveyor 66 which lifts the cooked chips from the stream and conveys them to subsequent stations for post-cooking operations.

In order to maintain the precooking and cooking liquids L at their desired temperatures, a conventional heat exchanger 68 may be utilized directly to heat the liquid supplied to cooking apparatus 16 and indirectly to heat the liquid supplied to the precooking apparatus 18. The heat exchanger 68 receives a first portion of the cooking liquid from the downstream end 64 of the cooking apparatus 16 via a pump 70 and flow control valve 72 and returns the liquid to the upstream end 60 thereof after heating it to approximately the upper end of the desired temperature range required for the cooking operation.

A second portion of the cooking liquid is routed from the discharge side of the pump 70 via another flow control valve 74, a conduit 75 and a plurality of conduits 76 to the series of nozzles 28 via the flow control valves 30. More particularly, as seen in FIGS. 3-6, various flow distribution manifolds 76 are associated with the nozzles 28 to ensure uniform flow of liquid to the nozzles. It will be seen, therefore, that both the liquid used for precooking and for cooking is recirculated through the cooking apparatus 16.

Figure 6:
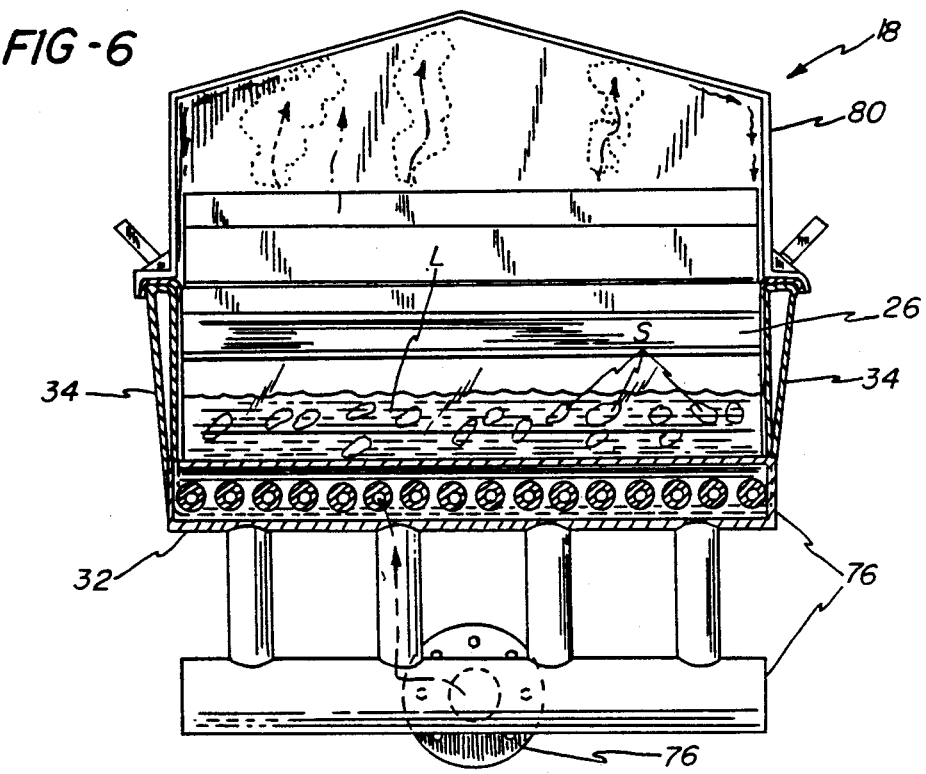
FIG. 6 is an upstream end elevational view, partly in section, of the improved precooking apparatus as seen along line 6—6 of FIG. 4, with the hood covering the sluice of the improved apparatus being shown in solid line form.

As shown in FIGS. 2, 4 and 6, both the cooking apparatus 16 and the sluice 22 of the precooking apparatus 18 are covered with respective hoods 78, 80. The hoods insulate the same and reduce heat loss and losses due to evaporation.

While the method herein described, and the form of apparatus for carrying this method into effect constitute preferred embodiments of this invention, it is to be understood that the invention is not limited to this precise method and form of apparatus, and that changes may be made in either without departing from the scope of the invention, which is defined in the appended claims.

What is claimed is:

1. A method of precooking a food product, comprising the steps of:
   producing a moving stream of heated precooking liquid having a temperature within a desired range of 200 to 300 degrees F. at an upstream end of the stream;
   introducing thin slices of unwashed raw potatoes enveloped in natural starch coating into the upstream end of the precooking liquid stream;

partially damning the precooking liquid stream and the potato slices carried therein by providing a plurality of paddle wheels rotatably mounted at multiple spaced apart sites along the stream in order to control the level of liquid therein and the degree of precooking of the slices therein; individually controlling the damning action of each of said paddle wheels by providing individual height adjustment of each paddle wheel relative to the level of the stream of liquid; and injecting heated precooking liquid into the stream adjacent to said spaced apart sites in order to maintain the temperature of said liquid within the desired range along the stream and concurrently to disperse and thereby prevent accumulation of the starch-coated potato slices at said sites as a result of said partial damming of the stream at said sites.

2. The method of claim 1 in which said injecting of the precooking liquid is produced by providing a series of nozzles in communication with the moving stream, each of said nozzles being disposed at one of said spaced apart sites adjacent to and below said rotatable paddle wheel and adapted to inject a jet of the precooking liquid into the stream.

3. The method of claim 2 in which said injecting of precooking liquid is controlled by operating a series of flow control valves connected in communication between said respective nozzles and a supply of the heated precooking liquid, each of said control valves being operable for controlling the flow rate of precooking liquid in said jet thereof injected by one of said nozzles and thereby the temperature of the precooking liquid in the moving stream.

4. The method of claim 2 comprising rotating each of said paddle wheels to define a rotational path for each of said paddle wheels and wherein said injecting of the precooking liquid is produced by injecting the jet of liquid into the stream along a path generally tangential to the rotational path of at least one of said paddle wheels.

5. In a method of preparing a food product including slicing raw unwashed potatoes into thin slices enveloped in a natural starch coating released from crushed potato cells during said slicing, precooking the starch-coated slices in a liquid at a temperature within a desired range of 200 to 300 degrees F., and thereafter cooking the resulting precooked slices in a liquid at a temperature within a desired range of 300 to 400 degrees F., said precooking of the starch-coated slices comprising the steps of:

producing a moving stream of heated precooking liquid having a temperature within the desired range of 200 to 300 degrees F. at an upstream end of the stream;

introducing thin starch-coated potato slices into the upstream end of the precooking liquid stream;

partially damming the precooking liquid stream and the potato slices carried therein by providing a plurality of paddle wheels rotatably mounted at multiple spaced apart sites along the stream in order to control the level of liquid therein and the degree of precooking of slices therein; individually controlling the damming action of each said paddle wheels by providing individual height adjustment of each paddle wheel relative to the level of the stream of liquid; and injecting heated precooking liquid into the stream adjacent to said spaced apart sites in order to maintain the temperature of said liquid within the desired range along the stream and concurrently to disperse and thereby prevent accumulation of the starch-coated potato slices at said sites as a result of said partial damming of the stream at said sites.

6. The method of claim 5 in which said injecting of the precooking liquid is produced by providing a series of nozzles in communication with the moving stream, each of said nozzles being disposed at one of said spaced apart sites adjacent to and below said rotatable paddle wheel and adapted to inject a jet of the precooking liquid into the stream.

7. The method of claim 6 in which said injecting of precooking liquid is further produced by operating a series of flow control valves connected in communication with said respective nozzles, each of said control valves being operable for controlling the flow rate of precooking liquid in said jet thereof injected by one of said nozzles and thereby the temperature of the precooking liquid in the stream.

8. The method of claim 7 in which said injecting of precooking liquid is still further produced by recirculating heated precooking liquid from the cooking liquid to said nozzles via said flow control valves.

9. The method of claim 6 comprising rotating each of said paddle wheels to define a rotational path of each of said paddle wheels and wherein said injecting of the precooking liquid is produced by injecting the jet of liquid into the stream along a path generally tangential to the rotational path of at least one of said paddle wheels.

* * * * *

UNITED STATES PATENT AND TRADEMARK OFFICE
CERTIFICATE OF CORRECTION

PATENT NO. : 4,956,189

DATED : September 11, 1990

INVENTOR(S) : Norman B. Johnson

It is certified that error appears in the above-identified patent and that said Letters Patent is hereby corrected as shown below:

Column 7, claim 1, line 7, "damning" should be -- damming --

Signed and Sealed this

Thirty-first Day of December, 1991

*Attest:*

HARRY F. MANBECK, JR.

*Attesting Officer*   *Commissioner of Patents and Trademarks*